United States Patent
Mikkers

[11] 4,222,027
[45] Sep. 9, 1980

[54] GLIDE PATH LIGHTING SYSTEM

[75] Inventor: Johannes C. J. Mikkers, Eindhoven, Netherlands

[73] Assignee: U.S. Philips Corporation, New York, N.Y.

[21] Appl. No.: 797,869

[22] Filed: May 17, 1977

[30] Foreign Application Priority Data

May 24, 1976 [NL] Netherlands ............ 7605528

[51] Int. Cl.² ............ B64F 1/18; F21V 11/08
[52] U.S. Cl. .................. 340/26; 340/383; 350/206; 361/351; 361/361
[58] Field of Search ............ 340/25, 26, 383; 350/206; 356/154, 151; 362/224, 311, 351, 361

[56] References Cited

U.S. PATENT DOCUMENTS

| | | | |
|---|---|---|---|
| 1,301,264 | 4/1919 | Hochstetter | 350/206 |
| 1,605,016 | 11/1926 | Trezise | 350/206 |
| 2,142,297 | 1/1939 | Albersheim | 350/206 |
| 3,191,146 | 6/1965 | Mitchell | 340/26 |
| 3,447,129 | 5/1969 | Birmingham et al. | 340/26 |
| 3,457,400 | 7/1969 | Appeldorn | 340/25 |
| 3,648,229 | 3/1972 | Burrows et al. | 340/26 |

FOREIGN PATENT DOCUMENTS 762181  5/1967  Italy .................... 340/26

*Primary Examiner*—John W. Caldwell, Sr.
*Assistant Examiner*—James J. Groody
*Attorney, Agent, or Firm*—Simon L. Cohen

[57] ABSTRACT

Disclosed is a glide path lighting system which is provided with a lens, a light source, and a screen whether or not constructed as a color filter disposed in the focal plane of the lens between the lens and the light source. The lens is provided with a diaphragm having an opening which is wider in the horizontal direction than in the vertical direction.

4 Claims, 4 Drawing Figures

GLIDE PATH LIGHTING SYSTEM

The invention relates to a glide path lighting system which is provided with a lens and a light source wherein in the focal plane of the lens situated between the lens and the light source there is at least at one side of the optical main axis a screen that may be opaque or may be a color filter.

Such a system is known from Italian patent specification No. 762,181.

One of the most important parts of the landing procedure for aircraft pilots is approaching the runway at the proper approach (glide path) angle. If an aircraft lands at too great an angle there is a risk of damaging the undercarriage of the aircraft, on the other hand if the aircraft lands at too small an angle it is not inconceivable that prior to arriving at the runway the aircraft hits objects which are located near the extension of the runway. The proper approach angle can be indicated by means of a lighting system in which use is made of light beams formed by means of lenses. For example, use can be made of a combination of approach lights, a portion of the approach light only being visible as white light sources when landing at the correct angle, while on landing at too large an angle several approach lights are visible. An example of such a system of approach lights is the so-called T-Vasis system which is disclosed in U.S. Pat. No. 3,152,316. As in general the landings angle must be adjusted very accurately by means of the lighting system, it is of great importance that the transition from dark to white light or from white light to colored light is very sharp. Although a lens has the advantage that the beam from light of the light source is visible to the approaching pilot at a very large distance, using a lens has the drawback that the transition from dark to white light is affected by the dispersion and the spherical aberration of the lens. These phenomena give rise to a trace of colored light at the transition from dark to white light. Such a trace may lead to confusing it with other color codes and adversely affects the landing procedure.

This drawback could be mitigated by using a substantially circular diaphragm in a manner customary in optics. In such an arrangement, as the lens opening becomes smaller the sharpness of the transition will increase proportionally but, at the same time, the light intensity of the light beam will decrease. This is disadvantageous because then the light of the light source is no longer visible at a great distance.

A glide path lighting system of the kind according to the invention mentioned in the preamble which obviates the above-mentioned drawbacks and whereby a sharp transition from dark to white light and from colored light to white light respectively is obtained is characterized in that at least the portion of the lens which is situated on the same side of the optical main axis as the screen, is provided with a diaphragm. The portion of the lens near a center line parallel to the edge of the screen which is nearest the optical main axis being less strongly diaphragmed than the other portions of the lens.

A diaphragmed lens as used herein is to be understood to mean a lens which is provided with a diaphragm.

By using a diaphragm shaped according to the invention, instead of a circular diaphragm, the transition from light to dark, on landing at a given angle, is equally as sharply as in the case of a diaphragm having a circular opening. However, because in the arrangement of the invention, a greater portion of the lens surface, namely near the center line parallel to the edge of the screen which is located nearest to the optical main axis, is not diaphragmed, a larger surface area of the lens is available for passing light. As a result, the light from the light source is visible at a greater distance than the light from a light source in a system provided with a circular diaphragm opening. One might expect that the dispersion and the aberration which unavoidably occur now that a comparatively larger portion of the lens is not covered by a diaphragm would have an adverse influence on the sharpness of the transition from light to dark. Since, however, the pilot is only hindered by dispersion and aberration of the lens in a plane substantially normal to the plane of the landing surface, the diaphragm of the invention is positioned such that the plane through the lens axis is substantially parallel to the landing surface. This reduces dispersion and aberration in the vertical plane to a level, which does not distract the pilot.

In principle the lens need only be diaphragmed at one side, namely at that side of the optical main axis where the screen, (which may be opaque or may be a color filter) is located. The colored trace of, for example, blue-green light formed by dispersion at the transition from white light to dark is a result of diffraction in the direction of the optical main axis of the blue-green rays which pass through the edges of the lens. Thus where these rays disappear in the white light no diaphragm is needed. Only that portion of the lens where, due to dispersion, the blue-green light is diffracted in such a way that it lands at or near the transition of light to dark requires shielding by a diaphragm.

A specific embodiment of a system according to the invention is characterized in that the lens is provided with a diaphragm in such a way that the distance from the point of intersection of the optical main axis and the lens to the edge of the diaphragm near the centre line of the lens parallel to the edge of the screen which is nearest the optical main axis is 1.2 to 2.5 times greater than the smallest distance from the point of intersection to the edge of the diaphragm.

Depending on the light code used, it may be customary, when landing at an increasingly smaller angle, that the pilot first observes light and then dark. It is, however, also possible that the code of the system is chosen such that when landing at a smaller angle first dark, thereafter white light and, finally, colored light (for example red light) is observed. The latter is the case if a red filter is provided in the focal plane of the lens on the other side of the optical main axis lying in a horizontal axial plane at some distance from the horizontal edge of the shielding plate which is situated nearest to the axis in the horizontal plane. In this case the diaphragm opening is symmetrical and has, for example, the form of an almond whose longitudinal axis is parallel to the edge of the screen which is nearest to the optical main axis.

In another embodiment of a diaphragm according to the invention the diaphragm opening has the form of rhombus whose long diagonal is parallel to the edge of the screen nearest the optical main axis. Such a form can be made in a very simple and rapid manner.

The invention will now be further explained with reference to the drawings in which:

FIG. 1 diagrammatically shows a longitudinal section of a glide path lighting system according to the invention;

Figure 1:
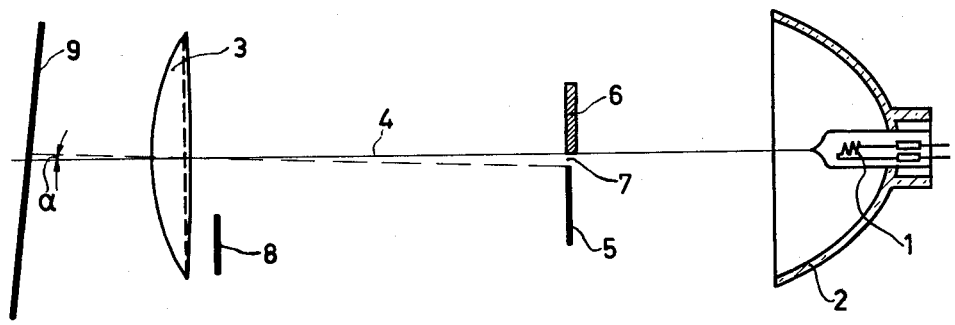

FIG. 1 shows a light source having for example, a helical filament 1. The light source is disposed in at the focal point of an ellipsoidal reflector 2 on the optical main axis 4 of a spherical lens 3. Disposed on one side of a plane extending along the optical axis 4, i.e. the plane normal to the plane of the drawing, is a light-impermeable screen 5. The screen 5 is positioned at the focal plane of the spherical lens 3 between the light source and the lens. Opposite the screen 5 and spaced therefrom is a red color filter 6 which is also disposed in the focal plane of the lens. The edges of the shielding screen 5 and the color filter 6 adjacent the optical axis form a slit 7 several millimeters wide through which the unshielded white light can pass. On the same side of the optical axis as the screen 5, the lens 3 is provided with a diaphragm 8, which has a shape such that the lens near a center line parallel to the edge of the shielding screen which is nearest to the optical main axis, i.e. the horizontal edge, is less strongly masked than in other places. To protect the optical system, the lens is provided with a detachable glass plate 9 on the side of the lens opposite the light source. With the arrangement shown in FIG. 1 the pilot can see a white light only when the glide path is within a given angle α defined by slit 7. In the described arrangement light passing through the color filter 6 becomes visible to a pilot landing at an angle smaller than α. In most cases this will be a red light which indicates danger. When the landing angle is too wide no light will be visible in the described arrangement, due to screen 5. In another arrangement, for example, in which filter 6 is removed and opaque plate 5 is replaced by a color (e.g. red) filter, white light is visible over a wide landing angle.

Either of these constructions may be provided in a leg of the T in T-vasis system which then indicates that landing approach is at too small an angle. Conversely, with a construction in a leg of an inverted T this indicates that the landing approach is at too large an angle.

Figure 2:
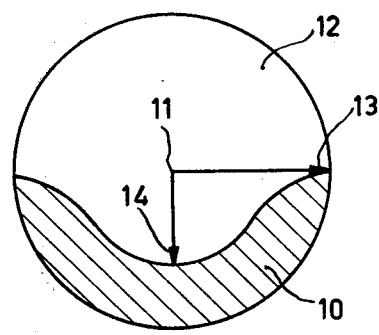
FIG. 2 shows a lens provided with a diaphragm shaped according to the invention.

FIG. 2 is an elevation view of a diaphragm in accordance with the invention. The diaphragm 10 is of a shape such that the horizontal distance from the center 11 of the lens 12 in the direction of arrow 13 (parallel to the horizontal edge of the shielding screen) to the edge of the diaphragm is approximately 1.7 times larger than the distance in a direction perpendicular thereto i.e., in the direction of arrow 14. As can be seen, the edge of diaphragm 10 is shaped so that its distance from the horizontal plane through 11 and 13, measured in a direction perpendicular to said plane, varies smoothly from a minimum at the two diametrically opposed edges of the lens to the dimension (arrow 14) at the axis.

Figure 3:
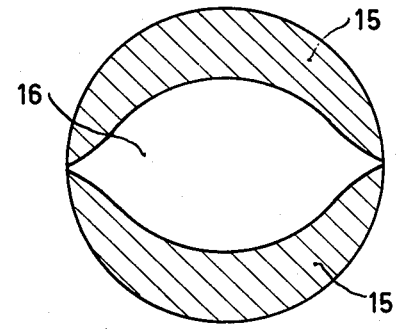
FIG. 3 shows a lens provided with a diaphragm having a diaphragm opening which is in the shape of an almond.

In FIG. 3 the diaphragm is indicated by 15. The portion of the lens which is not masked is indicated by 16. The diaphragm opening is created by mirroring two forms according to FIG. 1 around the horizontal plane which results in the form of an almond (eye shaped).

Figure 4:
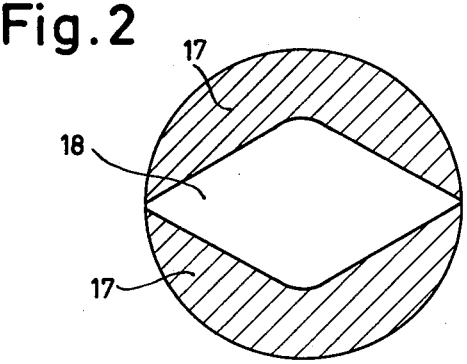
FIG. 4 shows a lens provided with a diaphragm having an opening which is in the form of a rhomb.

In FIG. 4 opening 18 of diaphragm 17 has the form of a rhomb. The diaphragm can be formed by placing a plate having the desired opening in front of the lens. It is also possible to apply the diaphragm in another manner, for example by painting the diaphragm of the desired form on the lens surface. Alternatively it is possible to produce the lens in a desired form so that a separate diaphragm is not needed. Such a lens is called a diaphragmed lens.

What is claimed is:

1. An aircraft glide path lighting system comprising a light source, a lens spaced from said light source, the focal plane of said lens being located at a position between said lens and said light source, a screen disposed in said focal plane on at least one side of the optical axis of said lighting system, said screen cooperating with said lens and said light source to render visible to an operator of an approaching aircraft light of a predetermined color when the glide path of the aircraft is within a predetermined angle with respect to said optical axis, and a diaphragm disposed between said lens and said screen for masking a peripheral portion of said lens, said diaphragm having a noncircular opening which is wider in the horizontal direction than in the vertical direction to reduce dispersion and aberration of said lens in the vertical plane.

2. A lighting system according to claim 1, wherein the horizontal distance from the center of said lens to the edge of said opening of said diaphragm is 1.2 to 2.5 times greater than the vertical distance from the center of said lens to the edge of said opening.

3. A lighting system according to claim 1, wherein said opening of said diaphragm is almond shaped.

4. A lighting system according to claim 1, wherein said opening of said diaphragm is rhombic.

* * * * *